United States Patent
Szücs et al.

(10) Patent No.: US 11,594,944 B2
(45) Date of Patent: Feb. 28, 2023

(54) METHOD FOR CONTROLLING A SYNCHRONOUS DOUBLE STATOR ELECTRIC MACHINE

(71) Applicant: ABB Schweiz AG, Baden (CH)

(72) Inventors: Áron Szücs, Helsinki (FI); Juhani Mantere, Helsinki (FI); Jahirul Islam, Helsinki (FI)

(73) Assignee: ABB Schweiz AG, Baden (CH)

( * ) Notice: Subject to any disclaimer, the term of this patent is extended or adjusted under 35 U.S.C. 154(b) by 237 days.

(21) Appl. No.: 16/930,788

(22) Filed: Jul. 16, 2020

(65) Prior Publication Data
US 2020/0350809 A1 Nov. 5, 2020

Related U.S. Application Data

(63) Continuation of application No. PCT/EP2018/050987, filed on Jan. 16, 2018.

(51) Int. Cl.
*H02K 16/04* (2006.01)
*H02K 1/12* (2006.01)
(Continued)

(52) U.S. Cl.
CPC .............. *H02K 16/04* (2013.01); *H02K 1/12* (2013.01); *H02K 1/276* (2013.01); *H02K 21/14* (2013.01);
(Continued)

(58) Field of Classification Search
CPC .......... H02K 1/12; H02K 1/276; H02K 16/04; H02K 21/14; H02K 2201/12; H02K 29/03; H02P 23/04; H02P 27/06
See application file for complete search history.

(56) References Cited

U.S. PATENT DOCUMENTS

| 4,281,276 A | 7/1981 | Cutler et al. |
| 4,379,325 A | 4/1983 | Krampe et al. |

(Continued)

FOREIGN PATENT DOCUMENTS

| CN | 1361578 A | 7/2002 |
| CN | 1549432 A | 11/2004 |

(Continued)

OTHER PUBLICATIONS

European Patent Office, International Search Report & Written Opinion issued in corresponding Application No. PCT/EP2018/050987, dated Oct. 11, 2018, 11 pp.

(Continued)

*Primary Examiner* — Naishadh N Desai
(74) *Attorney, Agent, or Firm* — Leydig, Voit & Mayer, Ltd.

(57) ABSTRACT

A method for controlling a synchronous double stator electric machine. A first stator and a first set of magnetic poles on a common rotor forms a first electric machine. A second stator and a second set of magnetic poles on the rotor forms a second electric machine. The first electric machine and the second electric machine is shifted mechanically by a predetermined angle. An electrical shift is produced to the control of at least the mechanically shifted electric machine with a respective frequency converter in order to at least partly compensate for the mechanical shift in the mechanically shifted electric machine.

9 Claims, 8 Drawing Sheets

(51) Int. Cl.
*H02K 1/276* (2022.01)
*H02K 21/14* (2006.01)
*H02K 29/03* (2006.01)
*H02P 23/04* (2006.01)
*H02P 27/06* (2006.01)

(52) U.S. Cl.
CPC .............. *H02K 29/03* (2013.01); *H02P 23/04* (2013.01); *H02P 27/06* (2013.01); *H02K 2201/12* (2013.01)

(56) References Cited

U.S. PATENT DOCUMENTS

| | | | |
|---|---|---|---|
| 2008/0169720 A1* | 7/2008 | Petek | H02K 16/04 310/184 |
| 2009/0206686 A1 | 8/2009 | Vollmer | |
| 2014/0300217 A1 | 10/2014 | Lim et al. | |
| 2015/0048704 A1 | 2/2015 | Fahimi et al. | |
| 2015/0381093 A1* | 12/2015 | Schock | H02P 23/0027 318/454 |
| 2016/0028296 A1 | 1/2016 | Kusase et al. | |
| 2017/0033618 A1* | 2/2017 | Liang | H02K 21/046 |

FOREIGN PATENT DOCUMENTS

| | | | | |
|---|---|---|---|---|
| CN | 1820403 | A | 8/2006 | |
| CN | 101847918 | A | 9/2010 | |
| CN | 101877569 | A | 11/2010 | |
| CN | 102223137 | A | 10/2011 | |
| CN | 103066783 | A | 4/2013 | |
| CN | 104811002 | A | 7/2015 | |
| CN | 106374706 | A | 2/2017 | |
| DE | 19917689 | A1 | 10/2000 | |
| DE | 102007028635 | A1 | 2/2008 | |
| DE | 102013112456 | A1 | 5/2014 | |
| EP | 0119374 | A1 | 9/1984 | |
| EP | 2667494 | A1 | 11/2013 | |
| EP | 3540924 | A1 * | 9/2019 | ............. H02K 11/33 |
| EP | 3681031 | A1 * | 7/2020 | ............. H02K 11/33 |
| JP | 2002369467 | A * | 12/2002 | |
| JP | 2002369467 | A | 12/2002 | |
| KR | 10-2012-0056408 | A | 6/2012 | |
| KR | 10-2014-0092006 | A | 7/2014 | |
| KR | 10-2014-0092008 | A | 7/2014 | |
| WO | WO-2014170619 | A1 * | 10/2014 | ............. H02P 27/06 |

OTHER PUBLICATIONS

China National Intellectual Property Administration, Office Action in Chinese Patent Application No. 201880085134.4, 22 pp. (dated Jan. 29, 2022).

The Korean Intellectual Property Office, Office Action in Korean Patent Application No. 10-2020-7022419, 12 pp. (dated Apr. 5, 2022).

The Korean Intellectual Property Office, Notice of Patent Grant in Korean Patent Application No. 10-2020-7022419, 14 pp. (dated Jul. 1, 2022).

* cited by examiner

METHOD FOR CONTROLLING A SYNCHRONOUS DOUBLE STATOR ELECTRIC MACHINE

FIELD

The invention relates to a method for controlling a synchronous double stator electric machine.

BACKGROUND

A synchronous double stator electric machine may be formed of at least one double stator unit comprising a rotor and two stators connected to the rotor. The rotor may comprise a first side provided with a first set of magnetic poles and an opposite second side provided with a second set of magnetic poles. A first stator may be positioned facing towards the first side of the rotor. A second stator may be positioned facing towards the second side of the rotor. The first stator may be connected to a first frequency converter which is controlled with a first controller. The second stator may be connected to a second frequency converter which is controlled by a second controller. Each of the stators may thus be controlled individually. The rotor and the first stator may form a first electric machine and the rotor and the second stator may form a second electric machine.

Cogging torque of electrical machines is the torque due to the interaction between the permanent magnets of the rotor and the stator slots of electric machine. It is also known as detent or "no-current" torque. This torque is position dependent and its periodicity per revolution depends on the number of magnetic poles and the number of teeth on the stator. Cogging torque is an undesirable component for the operation of the electric machine. It is especially prominent at lower speeds, with the symptom of jerkiness. Cogging torque results in torque as well as speed ripple. There exists prior art solutions to eliminate the cogging torque. One solution is to shift the first stator and the second stator mechanically by a predetermined angle in relation to each other in a synchronous double stator electric machine. The shift between the first stator and the second stator may be half slot pitch in a situation in which the first stator and the second stator has an equal number of slots. The cogging torque of the first electric machine and the cogging torque of the second electric machine will in such case be in an opposite phase due to the shift of half slot pitch between the first stator and the second stator. The cogging torque of the synchronous double stator electric machine may thus be reduced. The side effect of this shift is that also the power and/or the torque of the synchronous double stator electric machine is reduced.

The stator field lags the rotor field in a synchronous generator and vice a versa in a synchronous motor. This lagging expressed in angle is called the load angle. The term load angle is in this application used for the angle between the rotor flux and the stator flux in an electric machine i.e. in a synchronous electric motor and in a synchronous electric generator.

SUMMARY

An object of the present invention is to achieve an improved method for controlling a synchronous double stator electric machine.

The method for controlling a synchronous double stator electric machine according to the invention is defined in the independent claims.

The mechanical shifting of the first electric machine in relation to the second electric machine will reduce the cogging torque, which is a desired feature. The side effect of the mechanical shifting is, however, that also the power and/or the torque of the synchronous double stator electric machine is reduced due to loss of magnetization in the synchronous double stator electric machine.

When we load the synchronous double stator electric machine, there will be a change in the cogging torque. The magnetic flux from the rotor to the stator or from the stator to the rotor will be increased and the magnetic flux will also bend in accordance with the loading. The magnetic flux will bend towards the direction of rotation of the rotor in a synchronous electric motor and against the direction of rotation of the rotor in a synchronous electric generator. The amplitude of the cogging torque will also change due to the loading of the synchronous double stator electric machine so that a bigger load causes a bigger amplitude of the cogging torque. The waveform of the torque of the synchronous double stator electric machine will also be more distorted in a loaded condition.

The cogging torque will still at least partly be cancelled out also in the loaded condition due to the mechanical shifting of predetermined angle between the two electric machines. A problem in the loaded condition is the reduced performance (reduced power and/or reduced torque) of the synchronous double stator electric machine due to the mechanical shifting with the predetermined angle between the two electric machines. The mechanical shift with the predetermined angle between the first electric machine and the second electric machine will result in a substantial reduction in performance in case the first electric machine and the second electric machine are connected directly in series due to loss of magnetization.

The invention provides a solution to this loss of magnetization in the mechanically shifted synchronous double stator electric machine. The solution is to produce an electrical shift to the control of at least the mechanically shifted electric machine with the respective frequency converter in order to at least partly compensate for the mechanical shift in the mechanically shifted electric machine.

The electrical shift may be produced by rotating the magnetic flux of the respective stator in a direction opposite to the direction of the mechanical shift.

The electrical shift may further be produced by rotating the magnetic flux of the respective stator back to the position it had in the un-shifted topology.

The electrical shift may further be produced by shifting both electric machines electrically so that the values of the respective load angles in the un-shifted topology are restored in the shifted topology.

The electrical shift may further be produced by shifting both electric machines electrically by rebalancing the power and/or the torque between the two electric machines so that the sum of the torque harmonics of the two electric machines remains under a predetermined value.

The electrical shift may further be produced by shifting both electric machines electrically by rebalancing the power and/or the torque between the two electric machines so that the amplitude of the torque harmonics in the two electric machines are substantially equal.

The load angle may be calculated from different characteristic values of the synchronous double stator electric machine. The load angle of a new synchronous double stator electric machine may thus be calculated in advance in a mechanically un-shifted topology of the synchronous double stator electric machine from different characteristic values of the synchronous double stator electric machine throughout the whole operational range of the synchronous double stator electric machine. These calculated values of the load angle of the mechanically un-shifted synchronous double electric machine may then be used as set values in the control of the synchronous double stator electric machine in the shifted topology. Another possibility would be to run tests of the new synchronous double stator electric machine in a mechanically un-shifted topology in order to determine the load angle values of the un-shifted synchronous double stator electric machine throughout the whole operational range of the synchronous double stator electrical machine.

The starting point in the invention is a double stator electric machine provided with a mechanical shifting between the rotor and the stator in one of the two electric machines. The invention adds an electrical shifting to the mechanical shifting in at least one of the two electric machines in a double stator electric machine. The electrical shifting in the electric machine may be realized by shifting the magnetic flux of the electric machine. The electrical shifting of the magnetic flux in the electric machine may at least partially compensate for the loss in magnetization that the mechanical shifting of the electric machine causes.

DRAWINGS

In the following the invention will be described in greater detail by means of preferred embodiments with reference to the attached drawings, in which.

DETAILED DESCRIPTION

Figure 1:
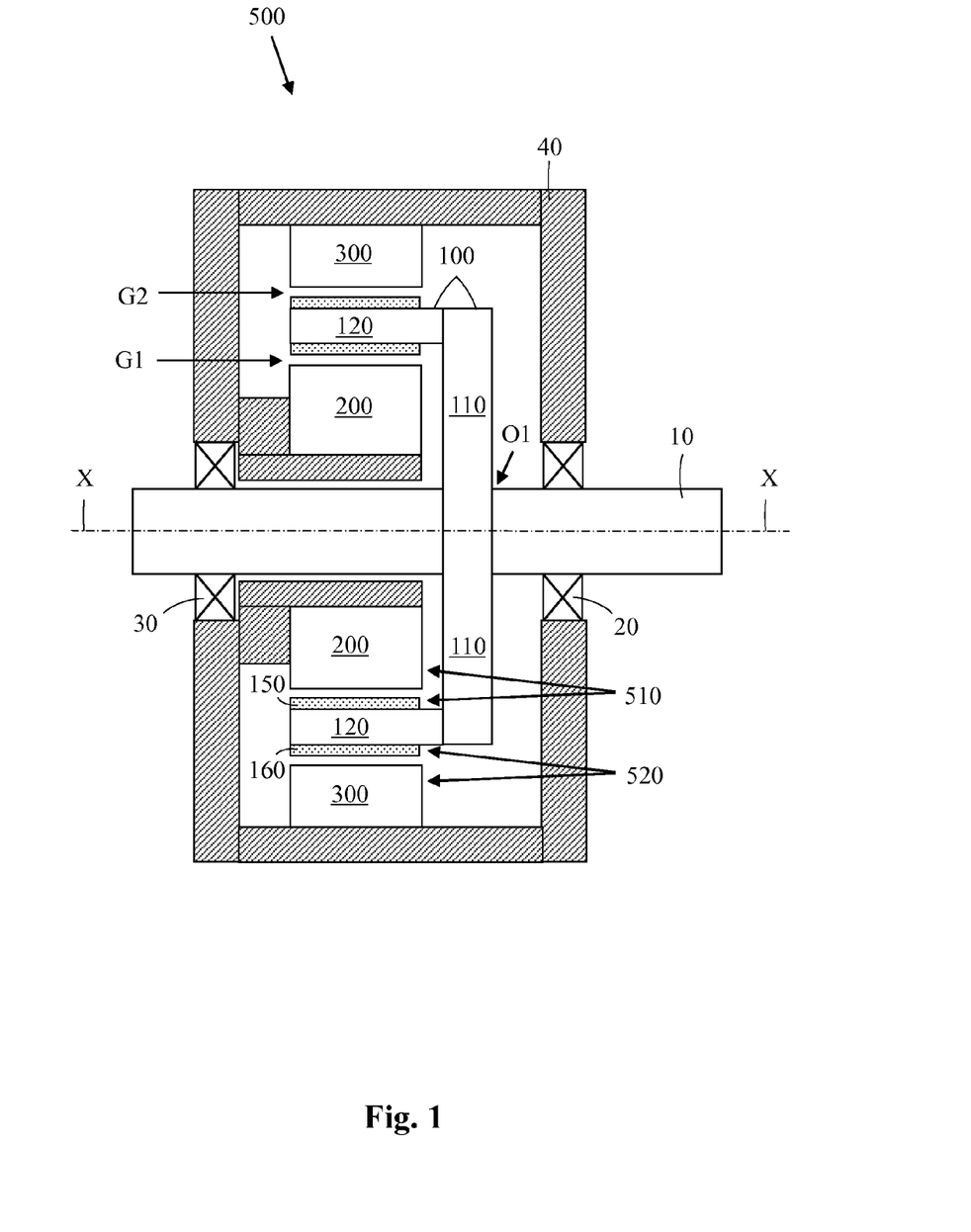
FIG. 1 shows a cross section of a radial flow synchronous double stator electric machine.

FIG. 1 shows a cross section of a radial flow synchronous double stator electric machine.

The synchronous double stator electric machine 500 comprises a rotor 100, a first stator 200 and a second stator 300.

The rotor 100 is supported on a rotating shaft 10 supported with bearings 20, 30 in a stationary frame 40. The centre of the shaft 10 forms a shaft line X-X. The rotor 100 rotates with the shaft 10. The rotor 100 may have a cup-shape. The rotor 100 may comprise a radially extending disc shaped first portion 110 and an axially X-X from a side surface of the first portion 110 at the outer perimeter of the first portion 110 extending cylindrical second portion 120. The second portion 120 of the rotor 100 may be concentric with the shaft line X-X. The first portion 110 may comprise an opening O1 in the centre of the disc. The shaft 10 may pass through the opening O1 so that the rotor 100 may become attached to the shaft 10 from the edge of the opening O1.

The cylindrical second portion 120 of the rotor 100 may be provided with a first set of permanent magnets 150 on a first side of the rotor 100 and a second set of permanent magnets 160 on an opposite second side of the rotor 100. The first side of the rotor 100 may be formed by the inner surface of the cylinder 120 and the second side of the rotor 100 may be formed by the outer surface of the cylinder 120. The first set of permanent magnets 150 may be equally distributed along the perimeter of the inner surface of the cylinder 120. The second set of permanent magnets 150 may also be equally distributed along the perimeter of the outer surface of the cylinder 120.

A cylindrical stationary first stator 200 may be positioned within the inner circumference of the second portion 120 of the rotor 100. The first stator 200 may be supported on the frame 40. A first air gap G1 may be formed between the first set of permanent magnets 150 on the inner surface of the second portion 120 of the rotor 100 and the outer surface of the first stator 200.

A cylindrical stationary second stator 300 may be positioned outside the outer circumference of the second portion 120 of the rotor 100. The second stator 300 may be supported on the frame 40. A second air gap G2 may be formed between the second set of permanent magnets 160 on the outer surface of the second portion 120 of the rotor 100 and the inner surface of the second stator 300.

The magnetic flux 4) between the rotor 100 and the first stator 200 and between the rotor 100 and the second stator 300 is radially directed in the electric machine shown in FIG. 1. The synchronous double stator electric machine in FIG. 1 is thus a radial flux synchronous double stator electric machine.

The first stator 200 and the first set of permanent magnets 150 form a first electric machine 510 within the double stator electric machine 500.

The second stator 300 and the second set of permanent magnets 160 form a second electric machine 520 within the double stator electric machine 500.

Figure 2:
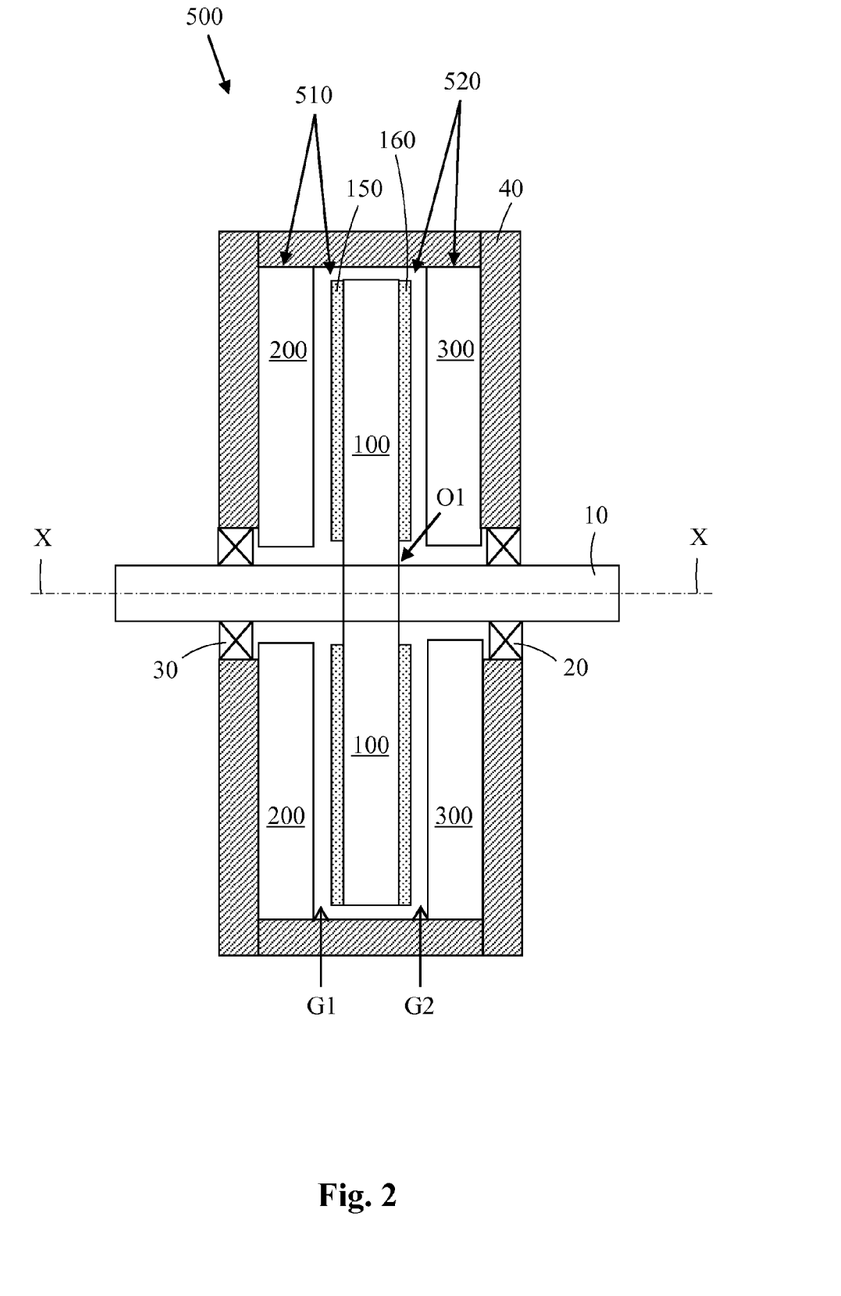
FIG. 2 shows a cross section of an axial flow synchronous double stator electric machine.

FIG. 2 shows a cross section of an axial flow synchronous double stator electric machine.

The synchronous double stator electric machine 500 comprises a rotor 100, a first stator 200 and a second stator 300.

The rotor 100 is supported on a rotating shaft 10 supported with bearings 20, 30 in a stationary frame 40. The centre of the shaft 10 forms a shaft line X-X. The rotor 100 rotates with the shaft 10. The rotor 100 may have a disc shape. The rotor 100 may comprise an opening O1 in the centre of the disc. The shaft 10 may pass through the opening O1 so that the rotor 100 may become attached to the shaft 10 from the edge of the opening O1.

A first side of the rotor 100 may be provided with a first set of permanent magnets 150 and a second opposite side of the rotor 100 may be provided with a second set of permanent magnets 160. The first side of the rotor 100 may be formed by the left hand surface of the rotor disc and the second side may be formed by the right hand surface of the rotor disc. The first set of permanent magnets 150 may form a ring on the first side of the rotor 100. The second set of permanent magnets 160 may form a ring on the second side of the rotor 100. The first set of permanent magnets 150 may be equally distributed along the perimeter of the first side surface of the rotor 100. The second set of permanent magnets 150 may also be equally distributed along the perimeter of the second side surface of the rotor 100.

A stationary disc shaped first stator 200 may be positioned outside the first side surface of the rotor 100. The first stator 200 may be supported on the frame 40. A first air gap G1 may be formed between the first set of permanent magnets 150 on the first side surface of the rotor 100 and the first stator 200.

A stationary disc shaped second stator 300 may be positioned outside the second side surface of the rotor 100. The second stator 300 may be supported on the frame 40. A second air gap G2 may be formed between the second set of permanent magnets 160 on the second surface of the rotor 100 and the second stator 300.

The magnetic flux 4) between the rotor 100 and the first stator 200 and between the rotor 100 and the second stator 300 is axially directed in the electric machine shown in FIG. 2. The synchronous double stator electric machine in FIG. 2 is thus an axial flux synchronous double stator electric machine.

The first stator 200 and the first set of permanent magnets 150 form a first electric machine 510 within the synchronous double stator electric machine 500.

The second stator 300 and the second set of permanent magnets 160 form a second electric machine 520 within the synchronous double stator electric machine 500.

Figure 3:
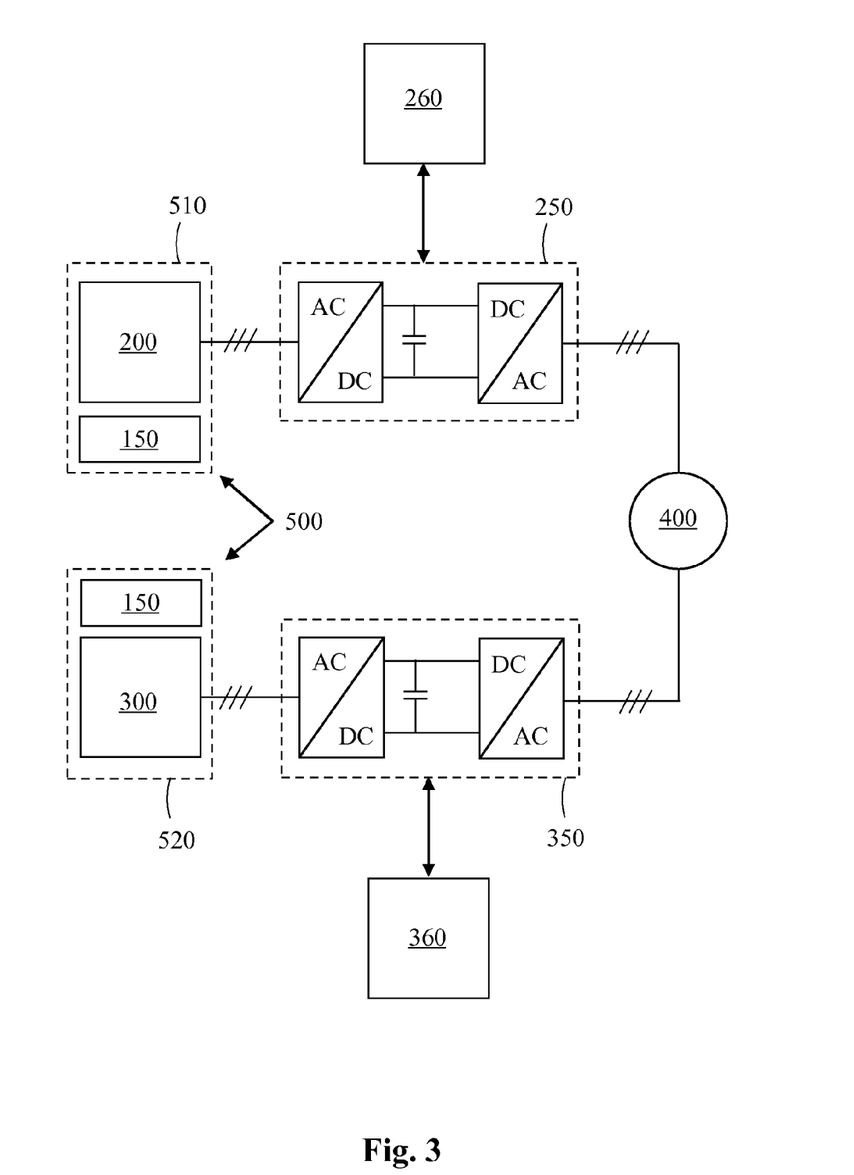
FIG. 3 shows a control system of a synchronous double stator electric machine.

FIG. 3 shows a control system of a synchronous double stator electric machine.

The first stator 200 of the synchronous double stator electric machine 500 may be connected to a first frequency converter 250 and the first frequency converter may be connected to the grid 400. The first frequency converter 250 may comprise a rectifier, an intermediate circuit and an inverter. The first frequency converter 250 may be operated in both directions i.e. power may be transformed from the first stator 200 to the grid 400 or vice a versa. The first frequency converter 250 may be controlled by a first controller 260. The first controller 260 may be a part of the first frequency converter 250 or a separate entity. The first frequency converter 250 controls the first electric machine 510.

The second stator 300 of the synchronous double stator electric machine 500 may be connected to a second frequency converter 350 and the second frequency converter may be connected to the grid 400. The second frequency converter 350 may comprise a rectifier, an intermediate circuit and an inverter. The second frequency converter 350 may be operated in both directions i.e. power may be transformed from the second stator 300 to the grid 400 or vice a versa. The second frequency converter 350 may be controlled by a second controller 360. The second controller 360 may be a part of the second frequency converter 350 or a separate entity. The second frequency converter 350 controls the second electric machine 520.

The first electric machine 510 and the second electric machine 520 may thus be controlled independently with their respective frequency controller 250, 350.

The synchronous double stator electric machine 500 may be a three phase synchronous double stator electric machine and the grid 400 may be a three phase electric grid.

The first stator 200 and the first set of permanent magnets 150 form a first electric machine 510 within the synchronous double stator electric machine 500.

The second stator 300 and the second set of permanent magnets 160 form a second electric machine 520 within the synchronous double stator electric machine 500.

The first controller 260 may control the first electric machine 510 through the first frequency converter 250 and the second controller 360 may control the second electric machine 520 through the second frequency converter 350 based on any known control method.

The control method could be a traditional Pulse Width Modulation (PWM) technique in which the frequency and the voltage is regulated and supplied through a modulator and semiconductor switches to the electric machine. The use of a modulator will, however, produce a delay in the control circuit, whereby the response of the electric machine to the frequency and voltage control is slowed down.

Another possibility would be to use a Direct Torque Control (DTC) that controls the torque and the magnetic flux of the electric machine directly without the use of a modulator. The DTC is based on an accurate electric model of the electric machine. The nominal values of the electric machine form the initial data in the electric model of the electric machine. The DTC will during the first start examine the electrical quantities of the electric machine and based on this adjust the electric model of the electric machine.

Figure 4:
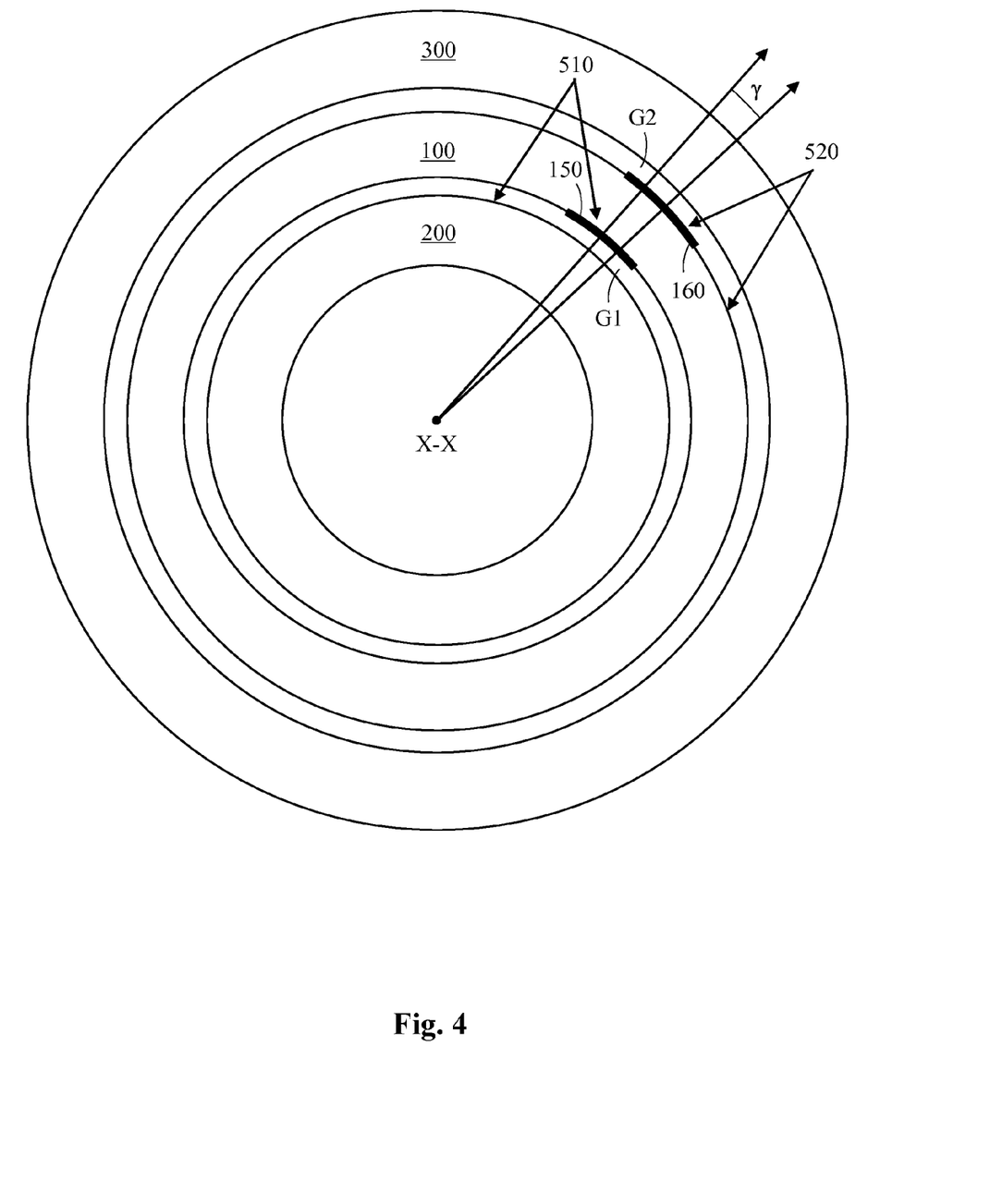
FIG. 4 shows a situation in which the permanent magnets on the inner surface and on the outer surface of the rotor are shifted by a predetermined angle.

FIG. 4 shows a situation in which the permanent magnets on the inner surface and on the outer surface of the rotor are shifted by a predetermined angle.

The synchronous double stator electric machine of FIG. 4 corresponds to the radial flow synchronous double stator electric machine shown in FIG. 1. The synchronous double stator electric machine comprises a rotor 100, a first stator 200, and a second stator 300. The rotor 100 may have a cylindrical form. The core of the first stator 200 and the core of the second stator 300 may also have a cylindrical form.

The rotor 100 is rotatable around a shaft axis X-X. The rotor 100 may comprise a first side provided with a first set of magnetic poles 150 and an opposite second side provided with a second set of magnetic poles 160. The rotor 100 may be positioned between the first stationary stator 200 and the second stationary stator 300.

The first stator 200 may face towards the first side of the rotor 100 so that a first air gap G1 may be formed between the first set of magnetic poles 150 and the first stator 200. The first stator 200 may be positioned inside the rotor 100. The first stator 200 may be connected to the first frequency converter 250 as shown in FIG. 3.

The second stator 300 may face towards the second side of the rotor 100 so that a second air gap G2 may be formed between the second set of magnetic poles 160 and the second stator 300. The second stator 300 may be positioned outside the rotor 100. The second stator 200 may be connected to the second frequency converter 350 as shown in FIG. 3.

The first side of the rotor 100 may be formed by the inner surface of the cylindrical rotor 100. The first set of permanent magnets 150 may thus be positioned on the inner surface of the rotor 100. The second side of the rotor 100 may be formed by the outer surface of the cylindrical rotor 100. The second set of permanent magnets 160 may thus be positioned on the outer surface of the rotor 100. The figure shows only one permanent magnet in the first set of permanent magnets 150 and only one permanent magnet in the second set of permanent magnets 160. There may, however, be several permanent magnets in the first set of permanent magnets 150 and in the second set of permanent magnets 160 distributed along the respective surface of the rotor 100.

The first stator 200 and the first set of permanent magnets 150 form a first electric machine 510 within the double stator electric machine 500.

The second stator 300 and the second set of permanent magnets 160 form a second electric machine 520 within the double stator electric machine 500.

The first set of permanent magnets 150 and the second set of permanent magnets 160 are mechanically shifted in relation to each other with a predetermined angle γ. The predetermined angle γ may be half slot pitch γ. The slot pitch γ in electrical angle is defined by equation (1):

$$\gamma = \frac{P}{2}\gamma_m \quad (1)$$

where P is the number of poles in the respective stator of the synchronous double stator electric machine and $\gamma_m$ is the mechanical angle between two adjacent slots in the respective stator of the synchronous double stator electric machine as defined by equation (2):

$$\gamma_m = \frac{2\Pi}{S} \quad (2)$$

Where S is the number of slots in the stator.

The axial portion of the stator winding is positioned in the axil slots in the stator.

A mechanical shift between the first stator 200 and the second stator 300 with a predetermined angle γ may be achieved as shown in FIG. 4 by shifting the first set of permanent magnets 150 on the inner surface of the rotor 100 and the second set of permanent magnets 160 on the outer surface of the rotor 100 with the predetermined angle γ in relation to each other. Another possibility would be to shift the first stator 200 and the second stator 300 with the predetermined angle γ in relation to each other. This shift with the predetermined angle γ between the first stator 200 and the second stator 300 constitutes a mechanical shifting between the first stator 200 and the second stator 300. The predetermined angle γ may be equal to half slot pitch γ.

The number of slots in the first stator 200 and the number of slots in the second stator 300 may be equal.

Figure 5:
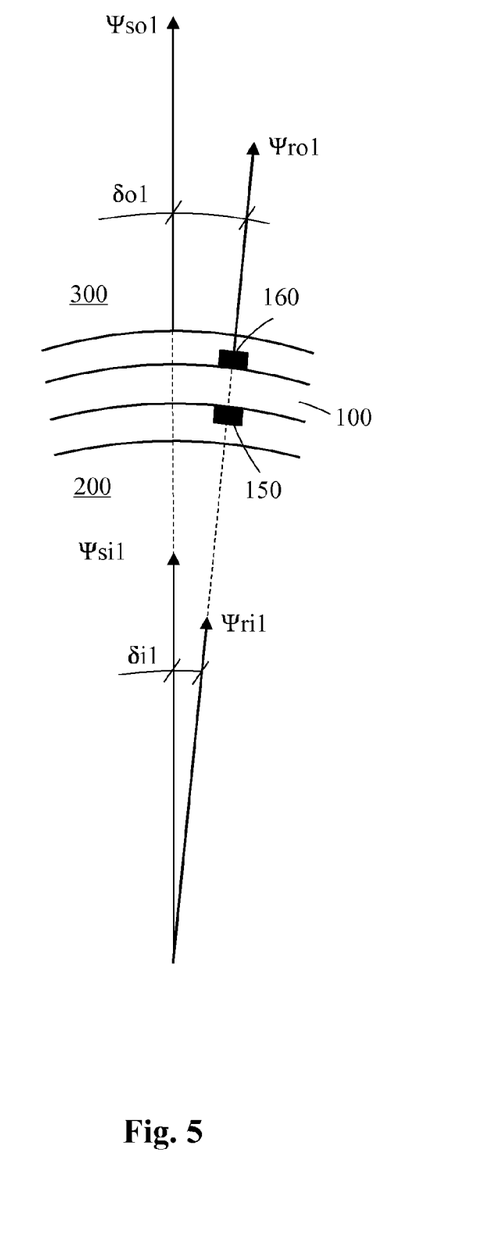
FIG. 5 shows the magnetic fluxes in a synchronous double stator electric machine in which there is no shift between the stators.

FIG. 5 shows the magnetic fluxes in a synchronous double stator electric machine in which there is no mechanical shift between the stators.

The figure shows the rotor inner magnetic flux Ψri1 i.e. the magnetic flux in the first, inner magnets 150 in the rotor 100 and the rotor outer magnetic flux Ψro1 i.e. the magnetic flux in the second, outer magnets 160 in the rotor 100. The figure shows further the stator inner magnetic flux Ψsi1 i.e. the magnetic flux in the first, inner stator 200 and the stator outer magnetic flux Ψso1 i.e. the magnetic flux in the second, outer stator 300. The figure shows further the inner load angle δi1 i.e. the load angle between the rotor inner magnetic flux Ψri1 and the stator inner magnetic flux Ψsi1 and the outer load angle δo1 i.e. the load angle between the rotor outer magnetic flux Ψro1 and the stator outer magnetic flux Ψso1. The inner load angle δi1 and the outer load angle δo1 are shown to be equal in the figure to emphasize the optimum load sharing and/or load angle selection in the un-shifted topology without shifted poles. The un-shifted topology refers to the situation in which there is no mechanical shift between the first electric machine 510 and the second electric machine 520. The inner load angle δi1 and the outer load angle δo1 can, however, be different in a situation in which an unequal pair of initial load angels in the first (inner) electric machine 510 and in the second (outer) electric machine 520 result in the best performance option in the un-shifted topology.

Figure 6:
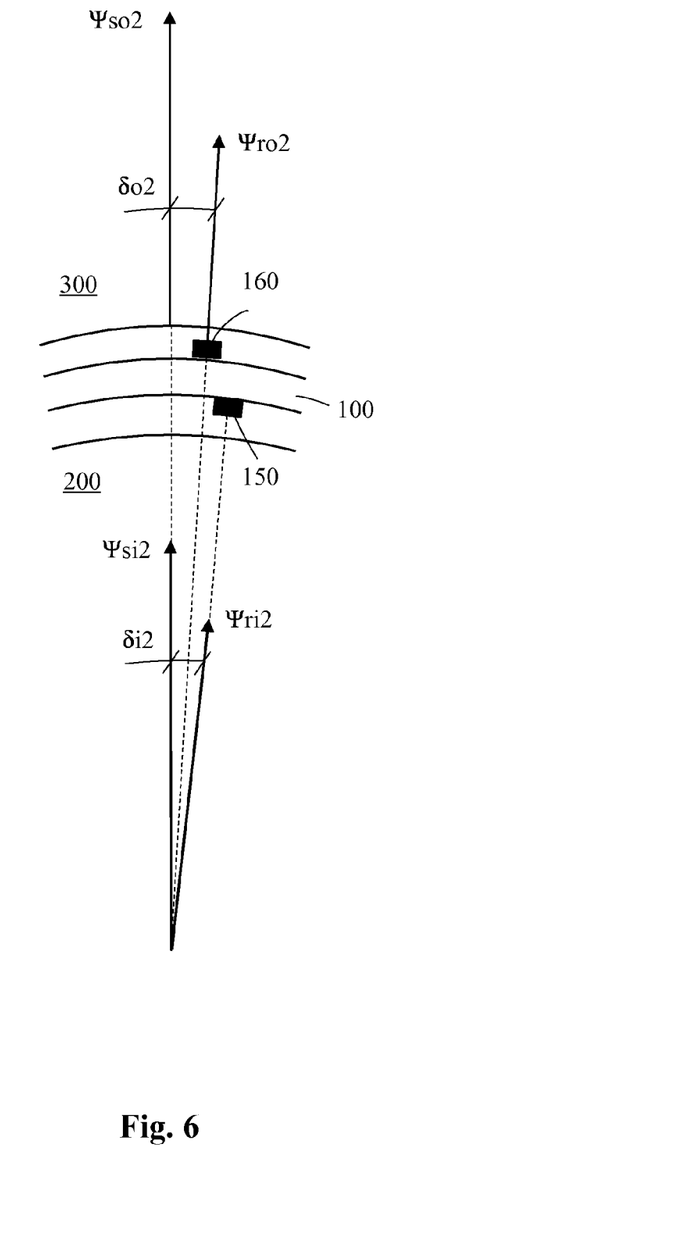
FIG. 6 shows the magnetic fluxes in a synchronous double stator electric machine in which there is a predetermined angle between the stators.

FIG. 6 shows the magnetic fluxes in a synchronous double stator electric machine in which there is a predetermined angle between the stators.

The second, outer set of magnets 160 on the outer surface of the rotor 100 have been mechanically shifted in relation to the first, inner set of magnets 150 on the inner surface of the rotor 100 with a predetermined angle without shifting the magnetic field of the second stator 300 in the second (outer) electric machine 520. The load angle δo2 in the second (outer) electric machine 520 will change. The shift of the second, outer set of magnets 160 on the outer surface of the rotor 100 with the predetermined angle in relation to the first, inner set of magnets 150 on the inner surface of the rotor 100 will in reality affect the load angle δi2 in the first (inner) electric machine 510 as well as the load angle δo2 in the second (outer) electric machine 520 i.e. both load angels δi2, δo2 will in reality change. This means that the inner load angle δi2 and the outer load angle δo2 seen in FIG. 6 will be different from the inner load angle δi1 and the outer load angle δo1 seen in FIG. 5. This is due to the disturbed load sharing between the first (inner) electric machine 510 and the second (outer) electric machine 520. The disturbance in the load sharing is caused by the mechanical shifting of the two electric machines 510, 520 in the synchronous double stator electric machine 500 in a situation in which the mechanical shift between the two electric machines 510, 520 is not compensated by a corresponding electrical shifting between the two electric machines 510, 520 in the synchronous double stator electric machine 500.

Figure 7:
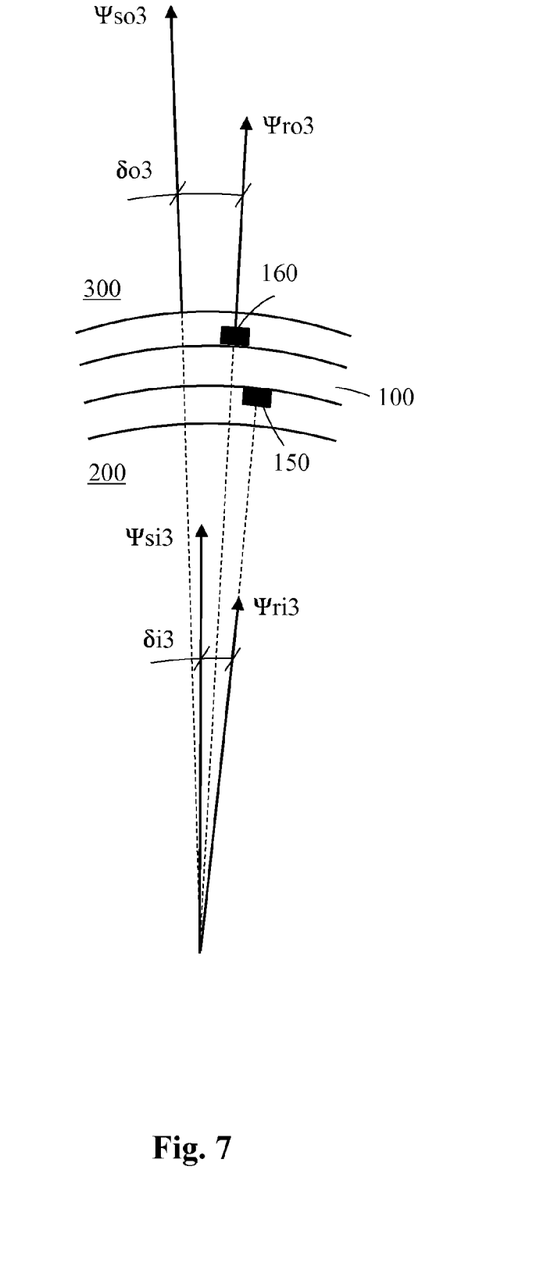
FIG. 7 shows the magnetic fluxes in a synchronous double stator electric machine in which there is a predetermined angle between the stators and the stator flux is repositioned.

FIG. 7 shows the magnetic fluxes in a synchronous double stator electric machine in which there is a predetermined angle between the stators and the stator flux is repositioned.

The magnet poles 150, 160 in the stators 200, 300 have been mechanically shifted in relation to each other with a predetermined angle and also the magnetic field Ψso3 of the second (outer) stator 300 in the second (outer) electric machine 520 has been shifted in a corresponding way. The magnetic field Ψso3 of the second (outer) stator 300 is repositioned to deliver the same performance as it did in the initial case. This can be done by rebalancing the power and/or the torque between the first (inner) electric machine 510 and the second (outer) electric machine 520.

The frequency controllers 250, 350 can be configured to control the load angle δi, δo in each of the electric machines 510, 520 so that the load angle δi, δo in the shifted topology is restored back to the value of the respective load angle δi, δo in the un-shifted topology.

The power and/or the torque between the first electric machine 510 and the second electric machine 520 may be rebalanced with the frequency converters 250, 350 so that the load angle δi, δo in the shifted topology is restored back to the value of the respective load angle δi, δo in the un-shifted topology throughout the whole range of operation of the synchronous double stator electric machine 500.

The power and/or the torque between the first electric machine 510 and the second electric machine 520 may be rebalanced so that:

$$\delta i1=\delta i3 \text{ and } \delta o1=\delta o3$$

This would in the idealized situation shown in FIG. 5 where the inner load angle δi1 equals to the outer load angle δo1 mean that:

$$\delta i1=\delta i3=\delta o1=\delta o3$$

The load angle δi of the first electric machine 510 and the load angle δo of the second electric machine 520 are thus the same in the shifted topology as they are in the un-shifted topology of the synchronous double stator electric machine 500.

It may also be possible to apply a control strategy in which the power and/or the torque between the two electric machines 510, 520 is rebalanced so that the sum of the torque harmonics of the two electric machines 510, 520 remains under a predetermined value throughout the whole range of operation of the double stator electric machine 500.

It may also be possible to apply a control strategy in which the power and/or the torque between the two electric machines 510, 520 is rebalanced so that the amplitude of the torque harmonics in the two electric machines 510, 520 are substantially equal.

The load angles of the mechanically un-shifted synchronous double stator electric machine may be used as reference values in the rebalancing of the power and/or the torque between the first electric machine and the second electric machine. These reference values may be calculated from characteristic values of the mechanically un-shifted synchronous double stator electric machine. Another possibility to determine the load angles of the un-shifted synchronous double stator electric machine would be to run tests on the un-shifted synchronous double stator electric machine throughout the operational range of the synchronous double stator electric machine.

The power P of an electric machine may be defined as:

$$P = T \times \omega$$

where T [Nm] is the torque of the electric machine and ω [radius/s] is the angular speed of the electric machine.

The torque T of an electric machine may be defined as:

$$T = \Psi \times I$$

where Ψ [Vs] is the magnetic flux of the electric machine and I [A] is the current of the electric machine.

The power P is thus directly proportional to the torque T and the rotation speed ω of the electric machine. The torque T is on the other hand directly proportional to the magnetic flux Ψ and the current I of the electric machine.

Figure 8:
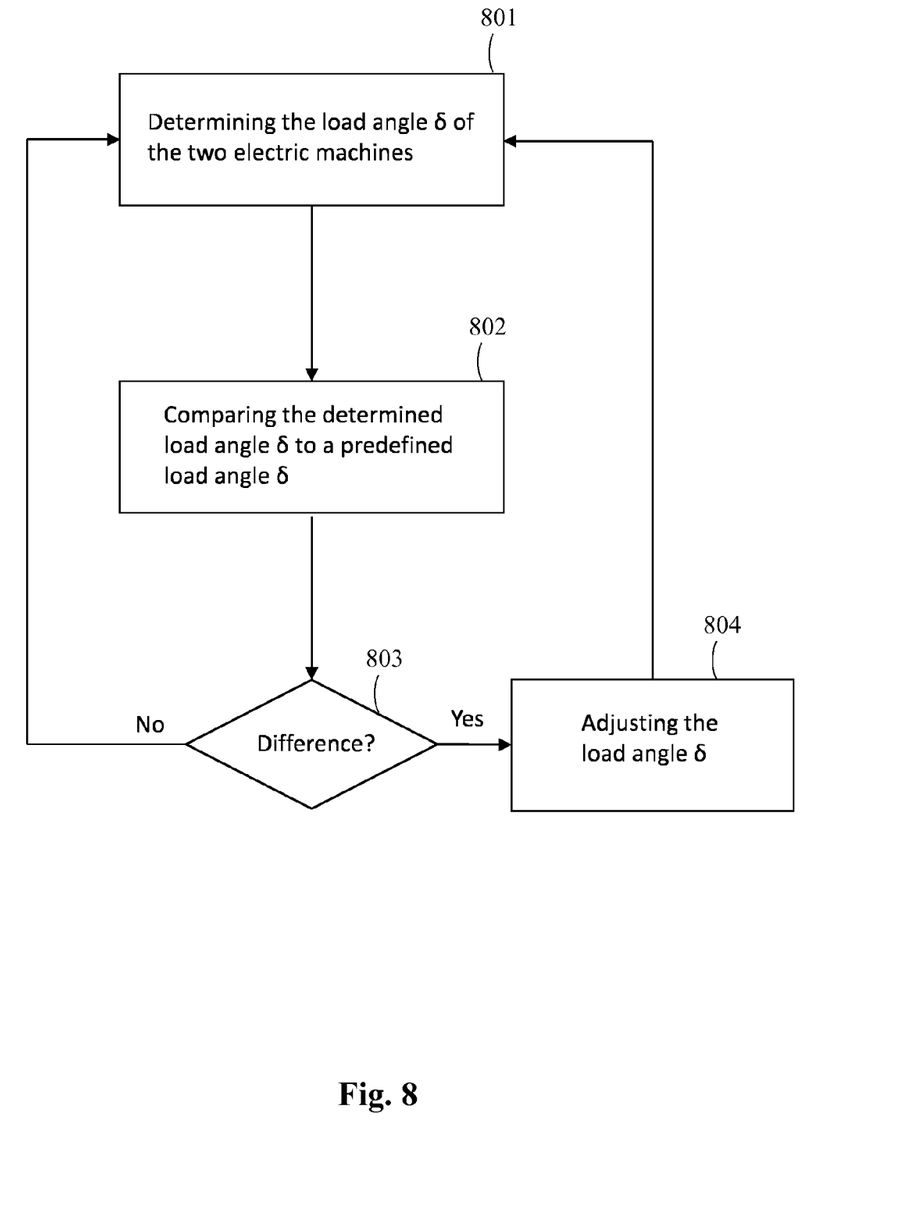
FIG. 8 shows a flow diagram of a method for controlling a synchronous double stator electric machine.

FIG. 8 shows a flow diagram of a method for controlling a synchronous double stator electric machine.

The first step is to determine 801 the load angle δ of the respective electric machine 510, 520. The second step is to compare 802 the determined load angle δ with a predetermined load angle δ. A difference 803 between the determined load angle δ and the predetermined load angle δ results in an adjustment 804 of the load angle δ.

A skilled person knows how to determine the load angle δ of a synchronous double stator electric machine. This is explained e.g. in the book "Electrical Machine Drives Control: An Introduction", by Juha Pyrhonen, Valeria Hrabovcova, R. Scott Semken, November 2016, ISBN: 978-1-119-26045-5.

The control 260, 360 of the respective frequency converter 250, 350 in the synchronous double stator electric machine 500 is not limited to any specific control method. Any control method may thus be used to control the frequency converters 250, 350.

The predetermined angle defining the mechanical shift between the first stator and the second stator may advantageously be half slot pitch. This is advantageous in the sense that the cogging torque of the first electric machine and the cogging torque of the second electric machine are in this case in an opposite phase. The cogging torque of the synchronous double stator electric machine may thus be reduced. The predetermined angle defining the mechanical shift between the first stator and the second stator need not necessary be half slot pitch. The mechanical shift could be slightly less or slightly more than half slot pitch. The cogging torques of the two electric machines would still be in nearly opposite phases. The mechanical shift could be in the range of 0.9 times half slot pitch to 1.1 times half slot pitch.

The use of the invention is not limited to the synchronous double stator electric machine shown in the figures. The invention may be used in any electric machine fulfilling the requirements of the claims. The synchronous double stator electric machine shown in the figures is formed of one double stator unit. The synchronous double stator electric machine could comprise several double stator units, whereby each double stator unit may be controlled in accordance with the inventive method.

The invention may be used in a radial flux electric machine and in an axial flux electrical machine. FIG. 1 shows one example of a radial flux electric machine and FIG. 2 shows one example of an axial flux electric machine.

The synchronous double stator electric machine may be a synchronous electric generator or a synchronous electric motor.

The techniques described herein may be implemented by various means so that an apparatus implementing one or more functions described with an embodiment comprises not only prior art means, but also specific means for implementing the one or more functions described with an embodiment and it may comprise separate means for each separate function, or specific means may be configured to perform two or more functions. The specific means may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

It will be obvious to a person skilled in the art that, as the technology advances, the inventive concept can be implemented in various ways. The invention and its embodiments are not limited to the examples described above but may vary within the scope of the claims.

The invention claimed is:

1. A method for controlling a synchronous double stator electric machine being formed of at least one double stator unit comprising:
    a rotor being rotatable around a shaft axis, the rotor comprising a first set of magnetic poles and a second set of magnetic poles;
    a first stator facing towards the first set of magnetic poles, wherein the first set of magnetic poles and the first stator form a first electric machine within the double stator electric machine, the first electric machine being controlled by a first frequency converter, a first load angle being formed between the magnetic flux of the first stator and the magnetic flux of the first set of magnetic poles;
    a second stator facing towards the second set of magnetic poles, wherein the second set of magnetic poles and the second stator form a second electric machine within the double stator electric machine, the second electric machine being controlled by a second frequency converter, a second load angle being formed between the magnetic flux of the second stator and the magnetic flux of the second set of magnetic poles, wherein the first stator and the second stator has an equal number of slots, and one of the first and second electric machines comprises a mechanical shift with a predetermined angle between the rotor and the first stator or the second stator of said respective one of the first and second electric machines causing the synchronous double stator electric machine to operate in a shifted topology compared to an un-shifted topology in which the rotor and the two stators are aligned, the method comprising:

producing an electrical shift to the control of at least the mechanically shifted electric machine with the respective frequency converter in order to at least partly compensate for the mechanical shift in the mechanically shifted electric machine, wherein the electrical shift is produced by one or more of the group comprising:

rotating the magnetic flux of the respective stator in a direction opposite to the direction of the mechanical shift, rotating the magnetic flux of the respective stator back to the position it had in the un-shifted topology, electrically shifting both electric machines by restoring the values of the load angles in the shifted topology to the values of the load angles in the un-shifted topology, electrically shifting both electric machines by rebalancing a power and/or a torque between the two electric machines so that a sum of torque harmonics of the two electric machines remains under a predetermined value, and electrically shifting both electric machines by rebalancing the power and/or the torque between the two electric machines so that amplitudes of the torque harmonics in the two electric machines are substantially equal.

2. The method according to claim 1, wherein the mechanical shift is produced by shifting the two stators mechanically in relation to each other with the predetermined angle.

3. The method according to claim 1, wherein the mechanical shift is produced by shifting the first set of magnetic poles and the second set of magnetic poles on the rotor mechanically in relation to each other with the predetermined angle.

4. The method according to claim 1, wherein the predetermined angle is in the range of 0.9 times half slot pitch to 1.1 times half slot pitch.

5. The method according to claim 1, wherein the predetermined angle is half slot pitch.

6. The method according to claim 1, wherein the synchronous double stator electric machine is a radial flux electric machine.

7. The method according to claim 1, wherein the synchronous double stator electric machine is an axial flux electric machine.

8. A synchronous double stator electric machine being formed of at least one double stator unit comprising:

a rotor being rotatable around a shaft axis, the rotor comprising a first set of magnetic poles and a second set of magnetic poles;

a first stator facing towards the first set of magnetic poles, wherein the first set of magnetic poles and the first stator form a first electric machine within the double stator electric machine, the first electric machine being controlled by a first frequency converter, a first load angle being formed between the magnetic flux of the first stator and the magnetic flux of the first set of magnetic poles; and a second stator facing towards the second set of magnetic poles, wherein the second set of magnetic poles and the second stator form a second electric machine within the double stator electric machine, the second electric machine being controlled by a second frequency converter, a second load angle being formed between the magnetic flux of the second stator and the magnetic flux of the second set of magnetic poles, wherein the first stator and the second stator has an equal number of slots, one of the first and second electric machines comprises a mechanical shift with a predetermined angle between the rotor and the stator of said one of the first and second electric machines causing the synchronous double stator electric machine to operate in a shifted topology compared to an un-shifted topology in which the rotor and the two stators are aligned, and at least the first or the second frequency converter controlling the mechanically shifted electric machine being configured to produce an electrical shift to the mechanically shifted electric machine in order to at least partly compensate for the mechanical shift in the mechanically shifted electric machine, wherein the electrical shift is produced by one or more of the group comprising:

rotating the magnetic flux of the respective stator in a direction opposite to the direction of the mechanical shift, rotating the magnetic flux of the respective stator back to the position it had in the un-shifted topology, electrically shifting both electric machines by restoring the values of the load angles in the shifted topology to the values of the load angles in the un-shifted topology, electrically shifting both electric machines by rebalancing a power and/or a torque between the two electric machines so that a sum of torque harmonics of the two electric machines remains under a predetermined value, and electrically shifting both electric machines by rebalancing the power and/or the torque between the two electric machines so that amplitudes of the torque harmonics in the two electric machines are substantially equal.

9. A computer program product comprising program instructions embodied on a non-transitory computer readable medium, which program instructions, when run on a computer, cause the computer to control a synchronous double stator electric machine being formed of at least one double stator unit comprising:

a rotor being rotatable around a shaft axis, the rotor comprising a first set of magnetic poles and a second set of magnetic poles;

a first stator facing towards the first set of magnetic poles, wherein the first set of magnetic poles and the first stator form a first electric machine within the double stator electric machine, the first electric machine being controlled by a first frequency converter, a first load angle being formed between the magnetic flux of the first stator and the magnetic flux of the first set of magnetic poles; and a second stator facing towards the second set of magnetic poles, wherein the second set of magnetic poles and the second stator form a second electric machine within the double stator electric machine, the second electric machine being controlled by a second frequency converter, a second load angle being formed between the magnetic flux of the second stator and the magnetic flux of the second set of magnetic poles, wherein the first stator and the second stator has an equal number of slots, one of the first and second electric machines comprises a mechanical shift with a predetermined angle between the rotor and the stator of said one of the first and second electric machines causing the synchronous double stator electric machine to operate in a shifted topology compared to an un-shifted topology in which the rotor and the two stators are aligned, and wherein upon execution of the computer program by the computer there is produced an electrical shift to the control of at least the mechanically shifted electric machine with the respective frequency converter in order to at least partly compensate for the mechanical shift in the mechanically shifted electric machine, wherein the electrical shift is produced by one or more of the group comprising:

rotating the magnetic flux of the respective stator in a direction opposite to the direction of the mechanical shift, rotating the magnetic flux of the respective stator back to the position it had in the un-shifted topology, electrically shifting both electric machines by restoring the values of the load angles in the shifted topology to the values of the load angles in the un-shifted topology, electrically shifting both electric machines by rebalancing a power and/or a torque between the two electric machines so that a sum of torque harmonics of the two electric machines remains under a predetermined value, and electrically shifting both electric machines by rebalancing the power and/or the torque between the two electric machines so that amplitudes of the torque harmonics in the two electric machines are substantially equal.

* * * * *